(12) United States Patent
Mergen (10) Patent No.: US 7,812,740 B2
(45) Date of Patent: Oct. 12, 2010

(54) SYSTEMS, DEVICES, AND METHODS FOR PROVIDING ALERT TONES

(75) Inventor: John-Francis Mergen, Baltimore, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 252 days.

(21) Appl. No.: 11/862,757

(22) Filed: Sep. 27, 2007

(65) Prior Publication Data

US 2009/0085770 A1    Apr. 2, 2009

(51) Int. Cl.
  *G08G 1/00* (2006.01)
(52) U.S. Cl. .................. 340/904; 340/436; 340/471; 340/474
(58) Field of Classification Search ............ 340/903, 340/904, 435, 436, 463, 474, 471, 925, 944
See application file for complete search history.

(56) References Cited

U.S. PATENT DOCUMENTS

| | | | | |
|---|---|---|---|---|
| 5,012,221 A * | 4/1991 | Neuhaus et al. | ......... | 340/384.5 |
| 5,517,173 A * | 5/1996 | Cha et al. | ......... | 340/404.1 |
| 5,635,903 A * | 6/1997 | Koike et al. | ......... | 340/441 |
| 6,018,654 A * | 1/2000 | Valentine et al. | ......... | 455/414.4 |
| 6,178,326 B1 * | 1/2001 | Kalliokulju | ......... | 455/437 |
| 6,232,887 B1 * | 5/2001 | Carson | ......... | 340/903 |
| 6,519,512 B1 * | 2/2003 | Haas et al. | ......... | 701/19 |
| 6,731,202 B1 * | 5/2004 | Klaus | ......... | 340/425.5 |
| 7,095,336 B2 * | 8/2006 | Rodgers et al. | ......... | 340/903 |
| 7,362,241 B2 * | 4/2008 | Kubota et al. | ......... | 340/995.1 |
| 7,501,934 B2 * | 3/2009 | Tischer | ......... | 340/384.3 |
| 2003/0167230 A1 * | 9/2003 | McCarthy | ......... | 705/40 |
| 2005/0071375 A1 * | 3/2005 | Houghton et al. | ......... | 707/104.1 |
| 2005/0073438 A1 * | 4/2005 | Rodgers et al. | ......... | 340/944 |
| 2005/0232432 A1 * | 10/2005 | Yasushi et al. | ......... | 381/17 |
| 2005/0239436 A1 * | 10/2005 | Bell et al. | ......... | 455/404.2 |
| 2006/0026277 A1 * | 2/2006 | Sutcliffe | ......... | 709/224 |
| 2007/0257783 A1 * | 11/2007 | Matsumoto et al. | ......... | 340/425.5 |
| 2008/0123871 A1 * | 5/2008 | Trzmiel | ......... | 340/425.5 |
| 2008/0291052 A1 * | 11/2008 | Burns | ......... | 340/903 |
| 2009/0002197 A1 * | 1/2009 | Cemper | ......... | 340/989 |
| 2009/0080672 A1 * | 3/2009 | Smith | ......... | 381/86 |

* cited by examiner

*Primary Examiner*—Eric M Blount (57) ABSTRACT

Systems, devices, and methods for alerting pedestrians as to the presence of a vehicle are provided. The system for providing alert tones may include a personal communication device, such as a mobile terminal, a vehicle communication system, and an output device. A driver of a vehicle equipped with a vehicle communication system may select an alert tone to download to his vehicle directly using the vehicle communication system or indirectly via a communications link between the personal communication device and the vehicle communication system. Upon approaching a pedestrian, the driver may actuate the vehicle communication system to sound the alert tone through the output device by interacting with an input device, such as a button or a switch. Actuation may also be caused by a voice command or automatically, through the detection of an object within a certain distance of the vehicle via one or more sensors.

20 Claims, 9 Drawing Sheets

SYSTEMS, DEVICES, AND METHODS FOR PROVIDING ALERT TONES

BACKGROUND

As more and more drivers choose to "go green," a greater number of alternative fuel vehicles are hitting the roadways. Vehicles that run exclusively on batteries, hybrid vehicles that combine a gas engine with an electric motor, as well as simpler means of travel such as bicycles are growing ever more popular.

Unlike traditional automobiles and gas-powered vehicles, battery-powered, electric-powered, and man-powered modes of transportation lack the noise associated with combustion engines. The silent operation of these vehicles can pose a problem for pedestrians and others who have grown accustomed to identifying the presence of a vehicle nearby by listening for engine noise. A pedestrian looking the wrong way at an intersection may be surprised by the quiet passage of a hybrid vehicle. Even worse, the pedestrian may start crossing the street in front of the quiet vehicle before noticing its presence, forcing the driver to take evasive action and risking bodily injury to both the driver and the pedestrian.

The driver of a vehicle equipped with a horn may try to compensate for the lack of engine noise by beeping the horn to announce the presence of the vehicle. However, such horns are often loud and startling, especially when heard unexpectedly. A pedestrian may be distressed upon hearing the sound of an unexpected horn and may put himself in greater danger by reacting too quickly, for example tripping on the curb or moving into other vehicle traffic. Furthermore, the harsh sound of a vehicle horn, often associated with traffic jams, angry drivers, and road rage, may create a hostile and negative atmosphere for both the driver and the pedestrian.

Thus, there is a need for a system that provides pedestrians with a gentler indication of the presence of a vehicle, such as a quiet vehicle.

DETAILED DESCRIPTION

Exemplary embodiments now will be described hereinafter with reference to the accompanying drawings, in which exemplary embodiments and examples are shown. Like numbers refer to like elements throughout.

Systems, devices, and methods for alerting pedestrians as to the presence of a vehicle, such as a quiet-running vehicle, are provided in accordance with various exemplary embodiments. In general, systems, devices, and methods are described for notifying a pedestrian that a vehicle is in the vicinity in a gentle and unobtrusive way. A driver of a quiet vehicle may select an alert tone to download to his vehicle via a vehicle communication system carried by the vehicle or a personal communication device (such as a mobile terminal). The alert tone may, for example, mimic the sound of an ice cream truck, include a melody from a favorite song, or provide a gentle warning in words. Upon approaching a pedestrian, the driver of a quiet vehicle may sound the alert tone as an indication to the pedestrian of the presence of the vehicle.

Figure 1:
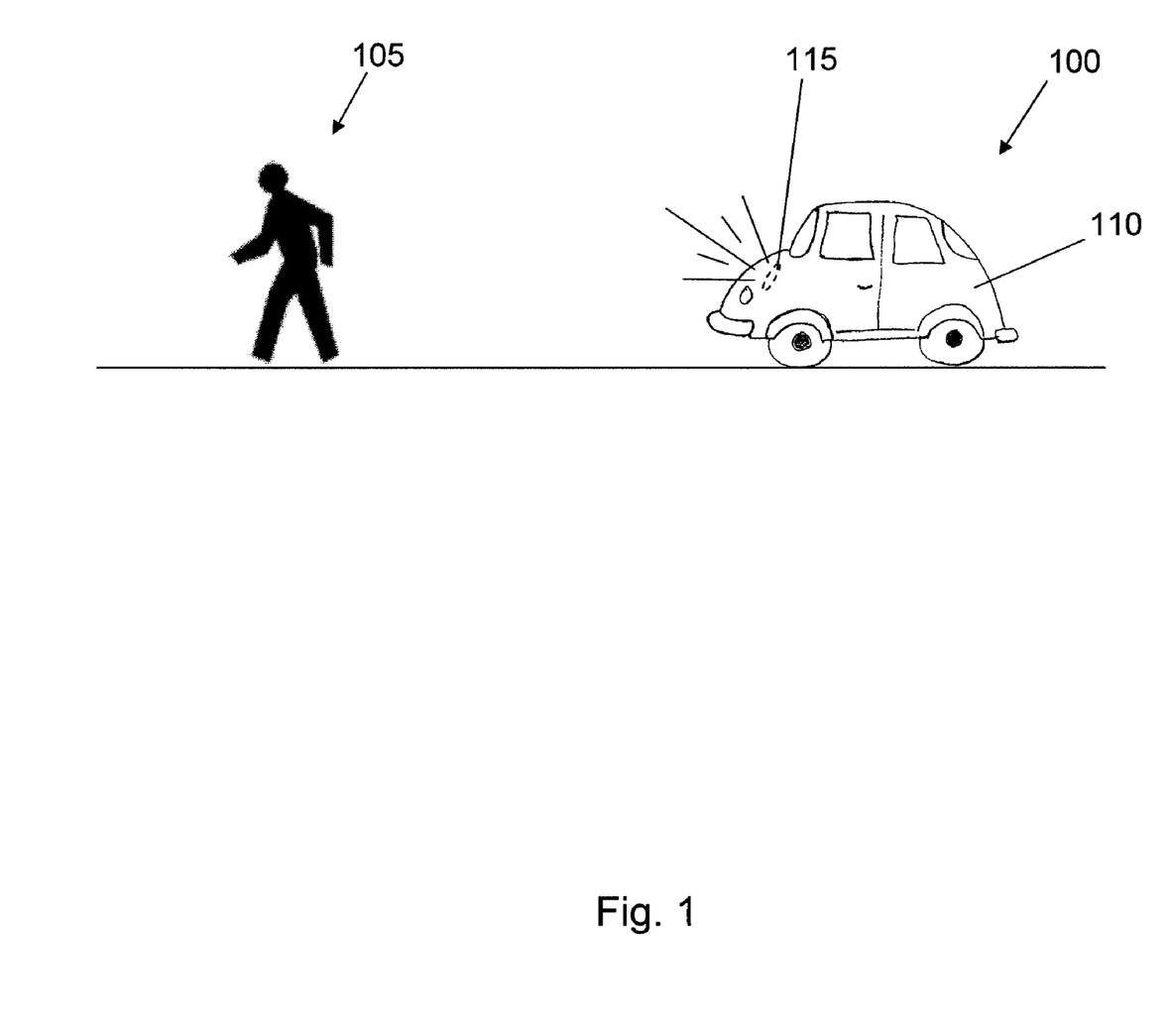
FIG. 1 is an illustration of a system for alerting pedestrians according to one embodiment.

FIG. 1 illustrates a situation in which a system 100 for alerting pedestrians may be useful. A pedestrian 105 may be walking with her back to an approaching quiet vehicle 110. For example, the pedestrian 105 may be walking through a parking lot going towards a retail establishment and may be distracted in thought or by conversation with a fellow pedestrian. Instead of startling or offending the pedestrian 105 by honking his horn or moving at a frustratingly slow speed until the pedestrian 105 has moved aside, the driver of the vehicle 110 may sound a previously downloaded alert tone to gently provide an indication to the pedestrian 105 of his presence, according to embodiments discussed below. The alert tone may be sounded using an audio output device 115 located on the vehicle 110, such as under the hood or mounted on the roof of the vehicle 110. Thus, the output device 115 is located such that the alert tone is sounded at least to the environment outside the vehicle and a pedestrian in the vicinity of the vehicle may be able to hear the alert tone.

In this regard, a pedestrian 105 includes any person in the vicinity of the vehicle 110 who the driver of the vehicle 110 wishes to alert. The pedestrian 105 may be a person walking or standing in or near the path of the vehicle 110. In addition, the pedestrian 105 may be a person on a bicycle or riding in another vehicle in the vicinity. The vehicle 110 may include any mode of transportation, such as an automobile, motorcycle, scooter, golf cart, personal transporter, bicycle, and other forms of transportation. The vehicle 110 may be configured to run on gasoline, hydrogen, natural gas, battery-power, electricity, or any combination of these, or may be propelled by human- or animal-power. The term driver thus refers to an operator of any of these vehicles.

Figure 2:
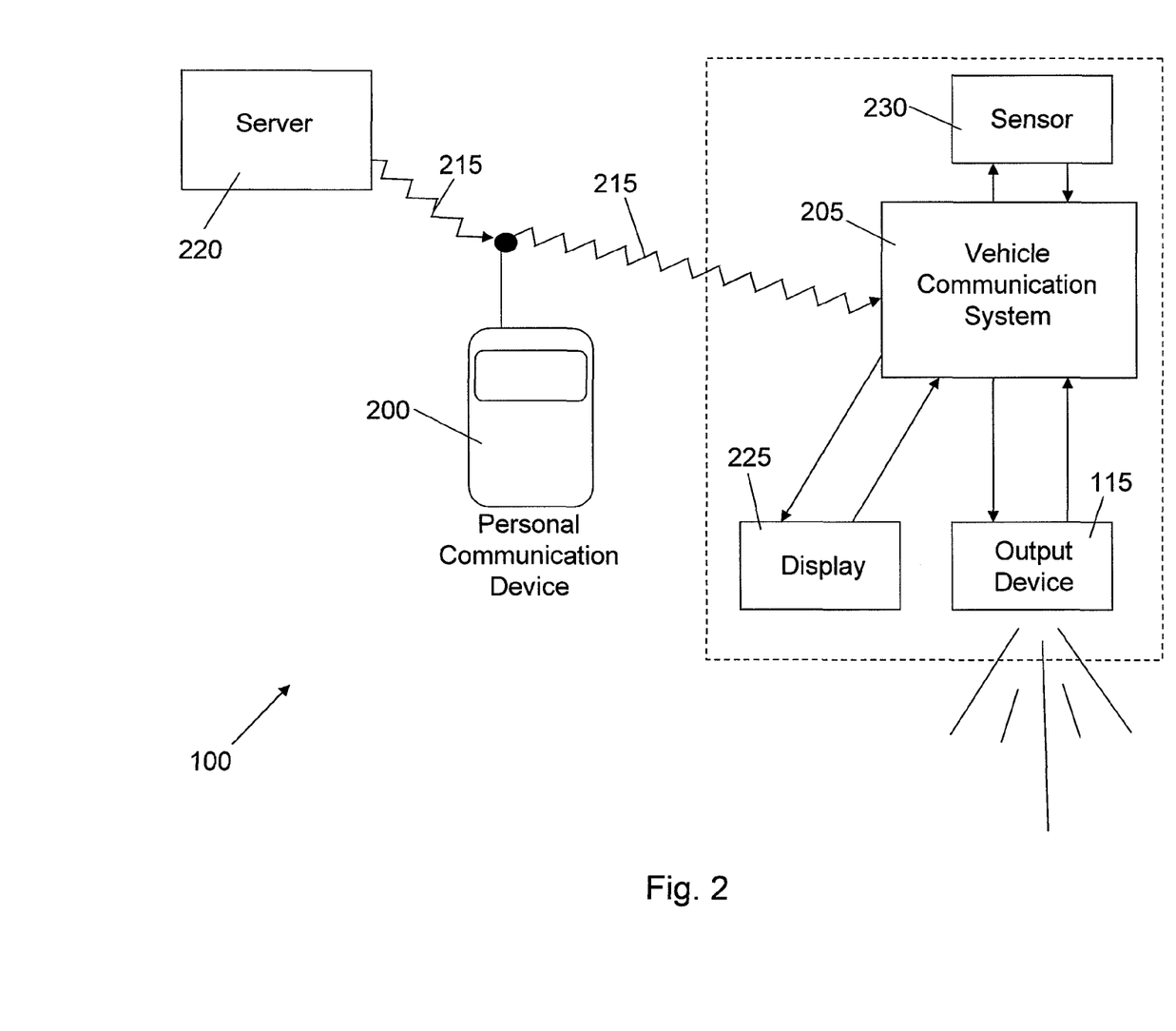
FIG. 2 is a schematic block diagram of a system for alerting pedestrians according to one embodiment.

FIG. 2 illustrates one embodiment of a system 100 for alerting pedestrians that includes a personal communication device 200, a vehicle communication system 205, and an output device 115. The personal communication device 200 may include a mobile terminal, such as a mobile telephone, portable digital assistant (PDA), pager, or any other type of voice, text, or video communication device configured to transmit and receive signals. The vehicle communication system 205 may be configured to establish a communications link with the personal communication device 200 such that data may be exchanged between the personal communication device 200 and the vehicle communication system 205. For example, the vehicle communication system 205 may be configured to establish a wireless connection with the personal communication device 200, such as via Bluetooth® wireless technology.

The personal communication device 200 of FIG. 2 is configured to receive an alert tone 215 and to transfer the alert tone 215 to the vehicle communication system 205. The personal communication device 200 may be configured to receive the alert tone 215 from a variety of sources and in a variety of ways. For example, the personal communication device 200 may communicate with a server 220 configured to access the alert tone 215 from a number of alert tones. The server 220 may be located on a network, such as a cellular network or the Internet. If the server 220 is accessible via the Internet, for example, a user of the personal communication device 200 may access the server 220 using a personal computer connected to the Internet or the personal communication device 200 itself. The user may be able to preview one or more samples of alert tones 215, listening to at least a portion of the selected alert tones prior to choosing a particular alert tone 215 to download to the vehicle communication system 205 via the personal communication device 200. The personal communication device 200 and the server 220 may thus be configured to communicate with each other, such as via a wide area network connection or a cellular connection.

Figure 3:
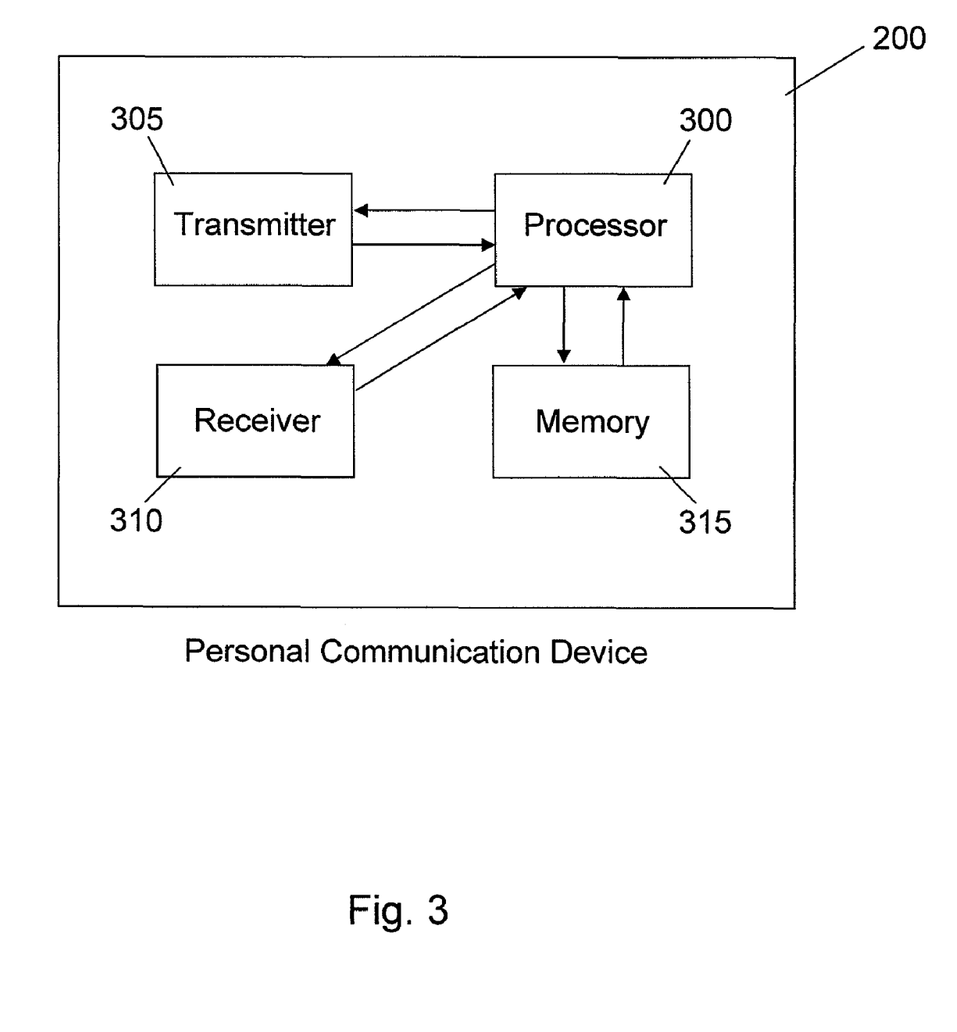
FIG. 3 is a schematic block diagram of a personal communication device according to one embodiment.

Referring to FIGS. 2 and 3, the personal communication device 200 of these embodiments includes a processor 300 configured to obtain the designated alert tone 215 (e.g., the alert tone selected by the user via the personal computer in the above example). The processor 300 is also configured to establish a communications link with the vehicle communication system 205, such that the device 200 and the vehicle communication system 205 are able to exchange data, and to transfer the obtained alert tone 215 to the vehicle communication system 205 to enable the vehicle communication system 205 to be actuated to sound the alert tone, as described below. The personal communication device 200 may further include a transmitter 305 and a receiver 310, each configured to communicate with the processor 300 and the vehicle communication system 205, as well as to communicate with a remote source of the alert tone 215 (such as the server 220). For example, the transmitter 305 may be configured to send a request for a particular alert tone to the server 220, and the receiver 310 may be configured to receive the requested alert tone 215. The transmitter 305 may further be configured to transfer the alert tone 215 to the vehicle communication system 205 to be sounded.

The alert tone 215 received by the vehicle communication system 205 may be embodied in a computer program, such as a program written in Ringing Tone Text Transfer Language (RTTTL). In some embodiments, upon obtaining the alert tone 215, the personal communication device 200 may store the alert tone 215 (e.g., the computer program) in a memory 315 of the device 200 and subsequently transfer the alert tone 215 to the vehicle communication system 205. For example, the processor 300 of the device 200 may establish a communications link with the vehicle communication system 205 when the device 200 is brought in proximity with the vehicle communication system 205. Thus, when a user carrying the personal communications device 200 approaches his vehicle, which has a vehicle communication system 205, the device 200 may, for example, sense the presence of the vehicle communication system 205 by detecting a Bluetooth® wireless signal emitted by the vehicle communication system 205. Upon sensing the vehicle communication system 205, the device 200 may establish the communications link such that data may be transferred between the device 200 and the vehicle communication system 205.

Figure 4:
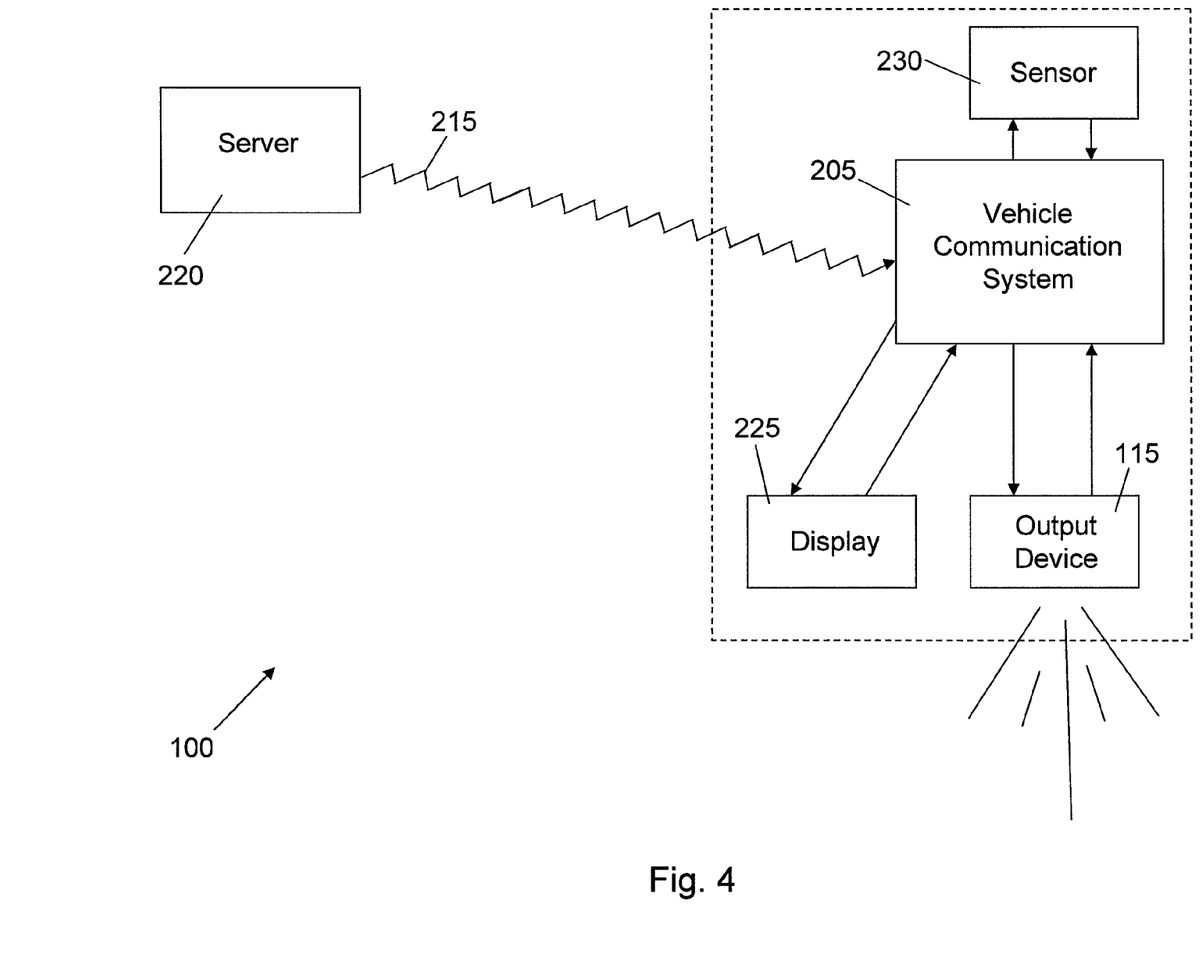
FIG. 4 is a schematic block diagram of a system for alerting pedestrians according to another embodiment.

In other embodiments, the vehicle communication system 205 may communicate directly with the source, such as the server 220, (rather than via the personal communication device) to request and receive the alert tones 215, as illustrated in FIG. 4, or may otherwise incorporate the functions of the personal communication device 200 described above. In this regard, the server 220 or other source may include a memory 500 configured to store a number of alert tones and a processor 505, shown in FIG. 5. The processor 505 may be configured to receive a request for an alert tone from the vehicle communication system 205, to obtain the requested alert tone from the memory 500, and to provide the requested alert tone to enable the vehicle communication system 205 to sound the alert tone upon actuation (for example, via the output device 115), as described below.

Figure 5:
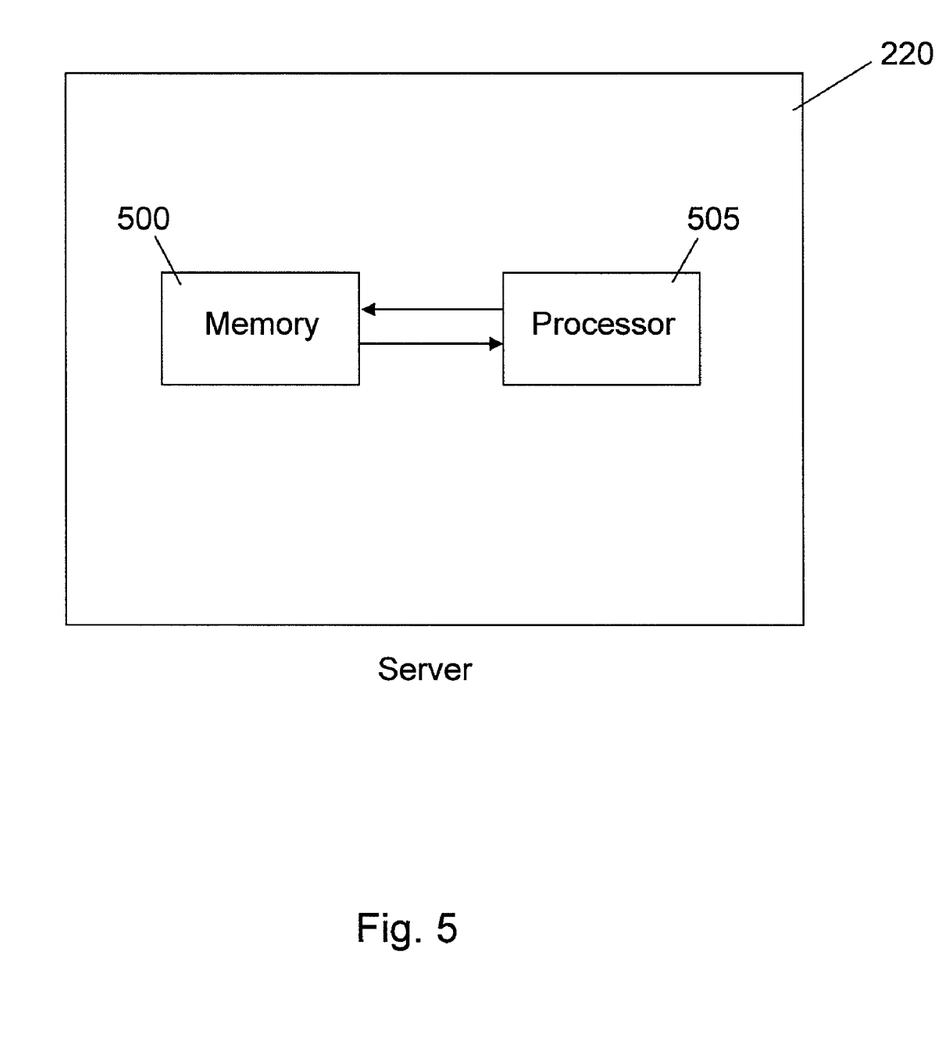
FIG. 5 is a schematic block diagram of a server according to one embodiment.

The processor 505 may also be configured to provide a sample of the alert tone to the vehicle communication system 205, such that the vehicle communication system may allow a user to preview the sample prior to the processor 505 providing the requested alert tone. Thus, the driver of the vehicle carrying the vehicle communication system 205 may listen to at least a portion of the alert tone prior to downloading (and in some cases, incurring the cost of) the requested alert tone. If, for example, the driver decides that the alert tone is unappealing or otherwise undesirable based on the sample, the driver may choose another alert tone to preview and download.

In some cases, such as the case depicted in FIG. 2 and previously described, the processor 505 is configured to communicate with a personal communication device 200, which is configured to establish a communications link with the vehicle communication system 205. Thus the processor 505 of the server 220 may also be configured to provide a sample of the alert tone to the personal communication device 200 such that a user of the device 200 may be able to preview the sample prior to receiving the requested alert tone from the source.

Figure 6:
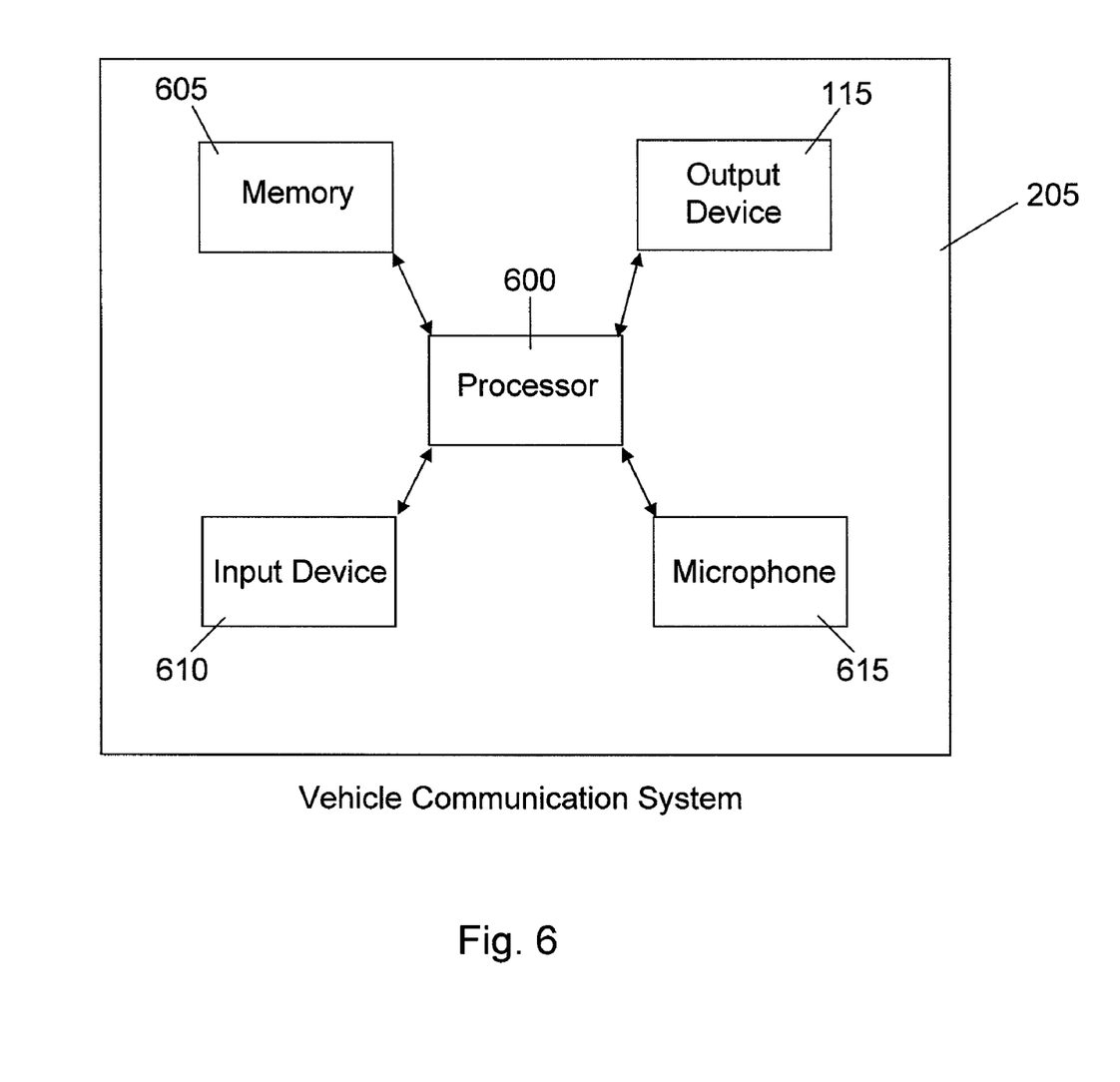
FIG. 6 is a schematic block diagram of a vehicle communication system according to one embodiment.

Turning to FIGS. 4 and 6, the vehicle communication system 205, which is on board or otherwise carried by the vehicle, includes a processor 600 configured to send a request for an alert tone to the source and to receive the requested alert tone from the source, as well as an output device 115 responsive to the processor 600 and configured to sound the alert tone. In some embodiments, such as the one shown in FIG. 2, the processor 600 is configured to establish a communications link with the personal communication device 200 and to send the request and receive the alert tone via the personal communication device 200. The processor 600 may also be configured to receive a sample of the alert tone, from the source (e.g., the server) directly or from the personal communication device 200 such that, as previously mentioned, the driver may preview the sample prior to receiving the requested alert tone from the source.

Furthermore, the processor 600 may be configured to actuate the output device 115 to sound the alert tone in response to an input, provided by a user (e.g., the driver) or otherwise. Referring to FIGS. 2, 4, and 6, the vehicle communication system 205 may be actuated in several ways to sound the alert tone 215 as a warning to pedestrians of the presence of the associated vehicle. For example, the vehicle communication system 205 may include an input device 610, such as a button, touch screen, or switch, configured to communicate with the processor 600 of the vehicle communication system 205 so as to sound the alert tone 215 based on the user's interaction with the input device 610. Thus, if the driver of the vehicle approaches a pedestrian who is unaware of the presence of the vehicle and wishes to alert the pedestrian, the driver may interact with the input device 610 (for example, by pushing a button) to actuate the vehicle communication system 205 and sound the alert tone.

In some cases, the input device 610 may be located on the steering wheel or dashboard of an automobile, for example, in addition to a standard input device for sounding a horn. For a motorcycle or bicycle, the input device 610 may be located on the handle bars or elsewhere within easy reach of the handle bars. The duration of the alert tone sounded may be dependent on how long the user interacts with the input device 610 (e.g., for as long as the user is pressing down on the button), or the alert tone may be sounded for a predetermined amount of time, such as 1 or 2 seconds, every time the input device 610 is activated.

The processor 600 of the vehicle communication system 205 may also be configured to actuate the output device 115 in response to an input from the user in the form of a voice command. For example, the vehicle communication system 205 may include a microphone 615 configured to receive the voice command from the user and actuate the output device 115 to sound the alert tone. The user may, for example, say the word "Pedestrian" or the words "Sound alert," and the processor 600 may in turn sound the alert tone via the output device 115 for a predetermined amount of time, such as 2 seconds.

In some cases, the processor 600 may be configured to actuate the output device 115 automatically based on the presence of an object within a predetermined distance. For example, the processor 600 of the vehicle communication system 205 may communicate with one or more sensors 230 (shown in FIG. 2), which may be separate from or integral to the vehicle communication system 205. The sensor(s) 230, for example, may be located on a front and/or rear bumper of the vehicle and may detect an object, such as a pedestrian, if the object is within a certain distance of the sensor 230, such as 5 feet. Upon detecting the presence of the object, the sensor 230 may communicate with the vehicle communication system 205 (i.e., the processor 600) to automatically actuate the output device 115 and sound the alert tone. Similarly, the vehicle communication system 205 may sound the alert tone automatically after detecting signals emitted by a device normally carried by a pedestrian (e.g., a mobile phone or PDA), such as via a Bluetooth® or other WLAN connection. Through automatic actuation, the alert tone may be sounded even if the driver is unable to manually sound the alert tone or for some reason doesn't notice the presence of the pedestrian in the vehicle's path.

The vehicle communication system 205 may include a memory 605 such that, in some cases, the alert tone 215 provided by the source (directly or via the personal communication device 200) may be saved in the memory 605. In that way, upon actuation of the vehicle communication system 205 (e.g., through a voice command or interaction with the input device), the alert tone 215 may be obtained from the memory 605 and sounded, as previously described.

In some cases, the memory 605 may be configured to store more than one alert tone 215 received from the personal communication device 200 and/or from the source. The vehicle communication system 205 may be configured to permit the user to select one of the stored alert tones as a default alert tone to be sounded upon actuation of the vehicle communication system 205. For example, the vehicle communication system 205 may include a display 225 (shown in FIG. 2) configured to present a number of alert tones from which the user is permitted to designate the alert tone to be sounded. The alert tones 215 displayed may include the alert tones stored in the memory 605 of the vehicle communication system 205, and in some embodiments the alert tones 215 displayed may include those stored elsewhere, such as in the memory 315 (shown in FIG. 3) of the personal communication device 200 or in the memory 500 (shown in FIG. 5) of the server 220. If the alert tones displayed reside on the personal communication device 200, designation of one of those alert tones may cause the designated alert tone to be transferred from the personal communication device 200 to the vehicle communication system 205 (e.g., to be stored in the memory 605 of the vehicle communication system 205, shown in FIG. 6). Furthermore, the display 225 shown in FIG. 2 may be separate from the vehicle communication system 205 (for example, part of the vehicle's navigation system or other onboard system) or may be part of the vehicle communication system 205, as indicated by the dashed lines surrounding the vehicle communication system 205, the display 225, and other components in FIG. 2.

Referring to FIGS. 2 and 4, the vehicle communication system 205, in some cases, may be configured to present to the user a number of alert tones 215 available from a particular source by communicating with the source directly or via a link with the source provided by the personal communication device 200. For example, the personal communication device 200 may provide a link to the Internet such that a representation of the alert tones 215 available from a particular server 220 may be presented to the user on the display 225 (e.g., an icon or a title representing each alert tone). In this case, the processor 300 of the personal communication system 200 (shown in FIG. 3) or the processor 600 of the vehicle communication system 205 (shown in FIG. 6) may be configured to receive a designation of the alert tone 215 to be obtained, e.g., from the server 220. The designation may be received, for example, through the user's interaction with the personal communication device 200 or the vehicle communication system 205.

Figure 7:
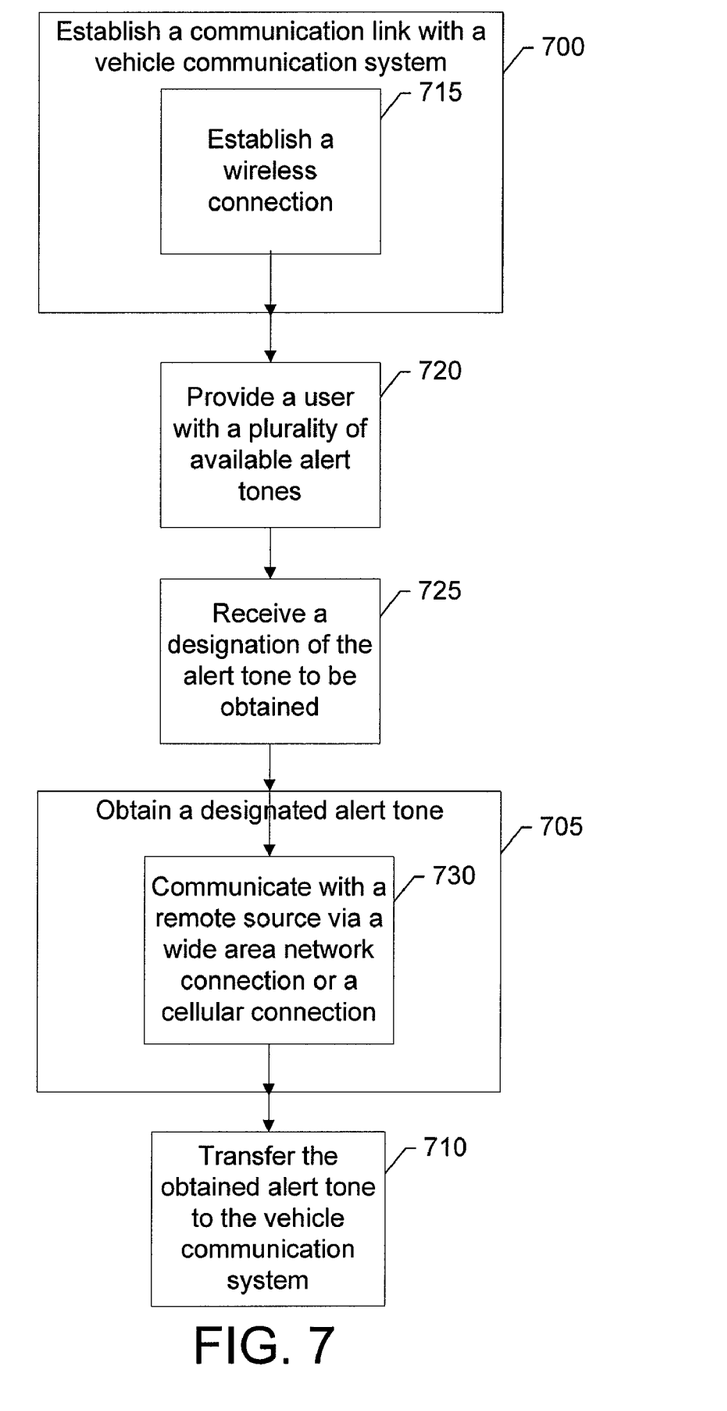
FIG. 7 illustrates a flowchart for alerting pedestrians according to one embodiment.

In other embodiments, a method of alerting pedestrians is provided. Referring to FIG. 7, in general a communications link is established with a vehicle communication system, a designated alert tone is obtained, and the obtained alert tone is transferred to the vehicle communication system to be actuated to sound the alert tone. FIG. 7, blocks 700-710. For example, a wireless connection, such as a Bluetooth® wireless connection, may be used to establish the communications link between a personal communication device and the vehicle communication system. Block 715.

In some cases, a user may be provided with a number of available alert tones, and a designation of the alert tone to be obtained may be received. Blocks 720 and 725. For example, a list of alert tones that are available from a server or other source may be presented on a personal communication system or on a display in communication with or integral to the vehicle communication system, as previously described. The user may then designate one of the alert tones, and the designated alert tone may be obtained from the corresponding source. In this regard, obtaining the designated alert tone may involve communication with a remote source, such as via a wide area network connection or a cellular connection, as previously described. Block 730.

Although the steps of providing available alert tones and receiving a designation of the alert tone are shown as occurring after the communications link has been established with the vehicle communication system, these steps may also occur before or during establishment of the link. For example, a user may designate an alert tone from the available alert tones provided prior to the establishment of a communications link with the vehicle communication system. In addition, the designated alert tone may be obtained before the communications link with the vehicle communication system is established. Blocks 700 and 705. As previously described, the designated alert tone may be obtained from a remote source and stored in a local memory. Subsequently, the communications link with the vehicle communication system may be established, and the obtained (and in some cases stored) alert tone may then be transferred to the vehicle communication system for future actuation and sounding of the alert tone.

Figure 8:
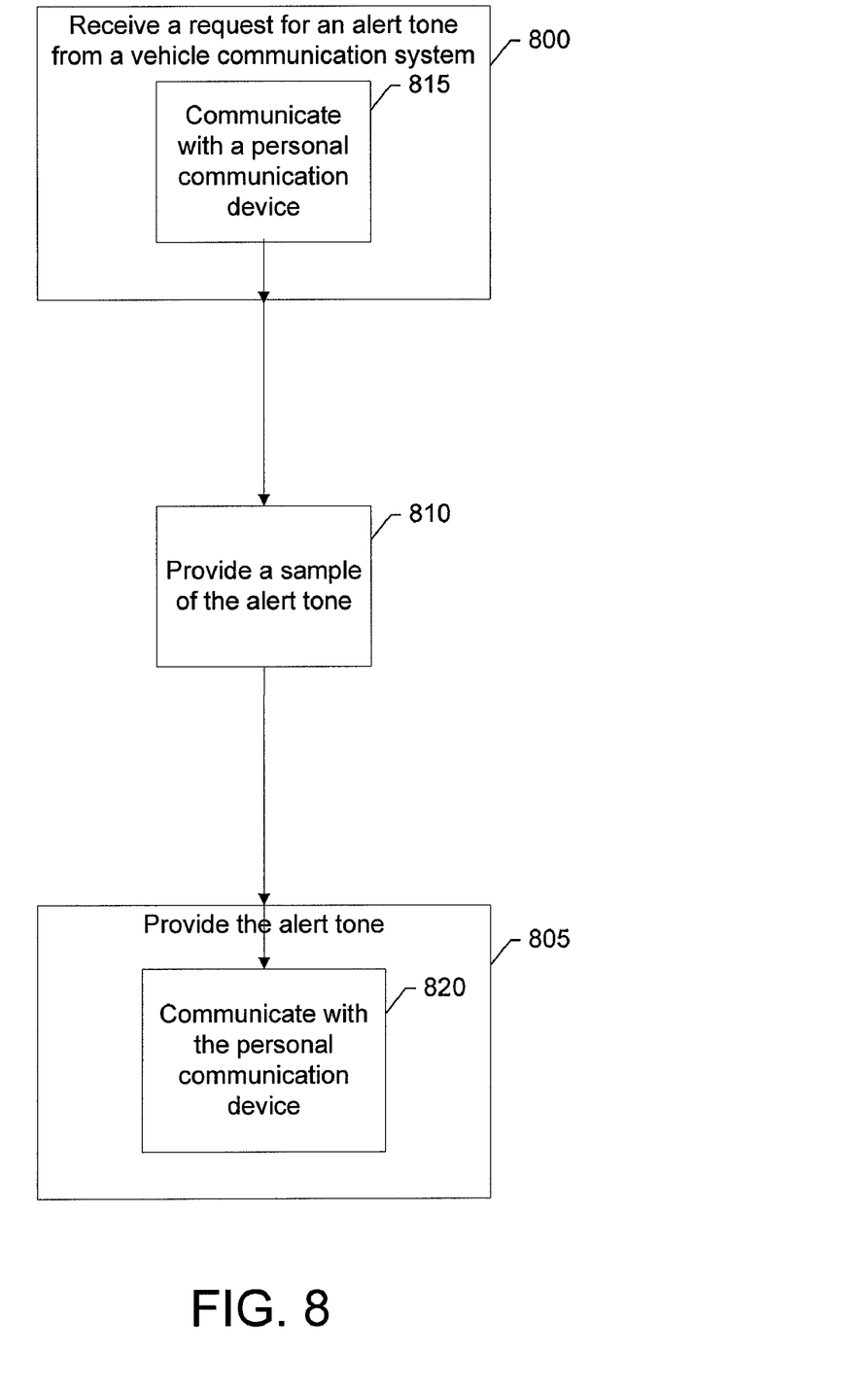
FIG. 8 illustrates a flowchart for providing alert tones according to one embodiment.

In other embodiments, a method of providing an alert tone to a vehicle communication system is provided, as shown in FIG. 8. Initially, a request for an alert tone is received from a vehicle communication system. The requested alert tone is then provided to enable the vehicle communication system to sound the alert tone upon actuation. FIG. 8, blocks 800 and 805. A sample of the alert tone may be provided to the vehicle communication system, before the alert tone itself is provided, so that the vehicle communication system may allow a user to have a preview of the sample prior to provision of the requested alert tone. Block 810. Although provision of the sample is shown as occurring after the request is received, the sample may be provided before receipt of a request, as well. For example, a user may first preview a sample of a particular alert tone and then, if the alert tone is acceptable, may request the alert tone.

In some cases, as previously discussed, receiving the request and providing the alert tone may include communicating with a personal communication device that is configured to establish a communications link with the vehicle communication system. Blocks 815, 820. A sample of the alert tone may thus be provided to the personal communication device that is configured to permit a preview of the sample prior to provision of the requested alert, rather than directly to the vehicle communication system. Block 810.

Figure 9:
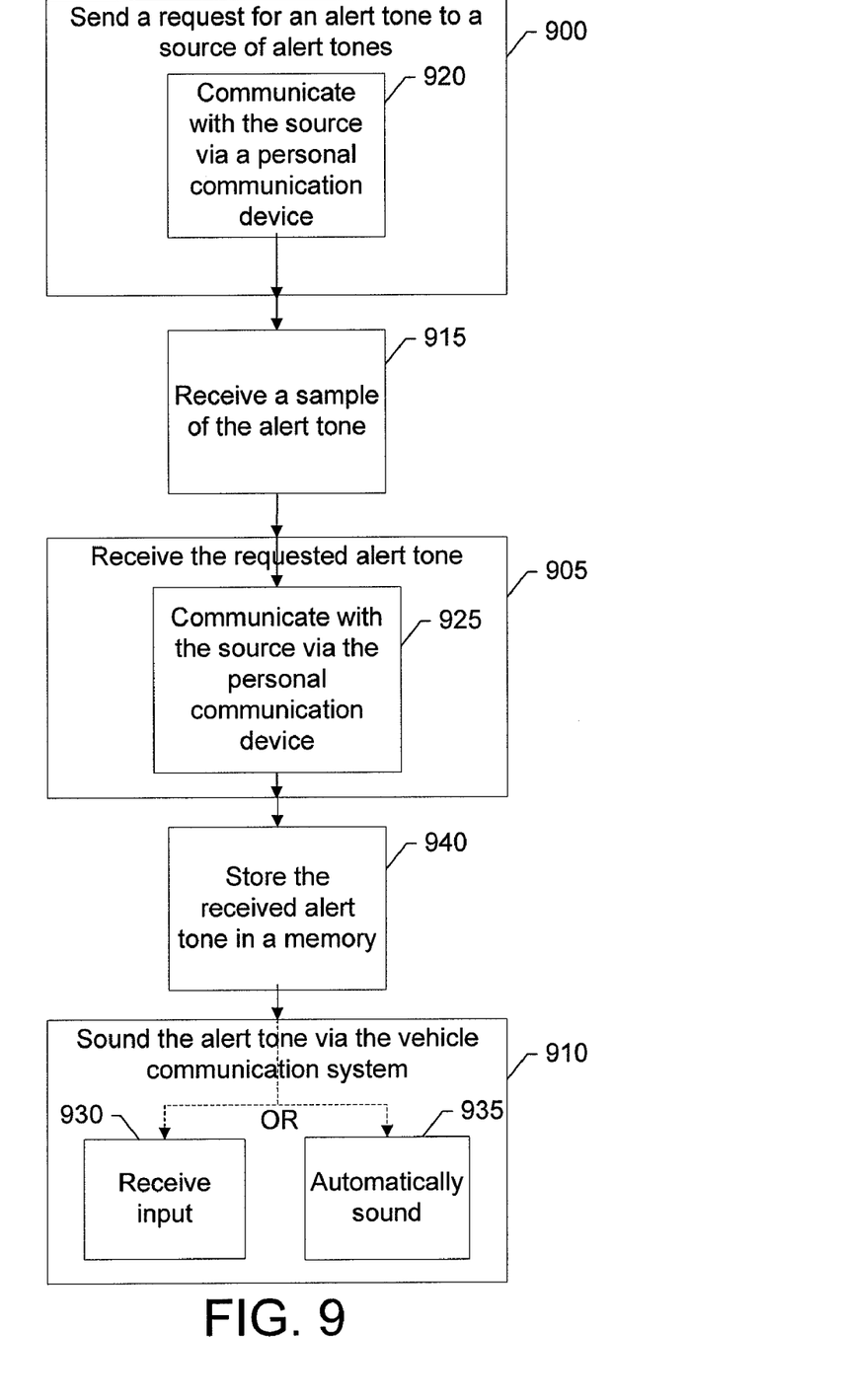
FIG. 9 illustrates a flowchart for alerting pedestrians according to another embodiment.

In other embodiments, a method of alerting pedestrians is provided as shown in FIG. 9. A request for an alert tone is sent to a source of alert tones, such as a server. The requested alert tone is then received at a vehicle communication system carried by a vehicle, as described above. The alert tone is then sounded via the vehicle communication system, for example using an output device. FIG. 9, blocks 900-910.

In some cases, a sample of the alert tone is received, and the sample can be previewed prior to receiving the requested alert tone from the source. Block 915. Although receipt of the sample is shown as occurring after the request is received, the sample may be received before a request is sent, as well. Sending the request and receiving the alert tone may, in some cases, include communicating with the source via a personal communication device that is configured to establish a communications link with the vehicle communication system, as depicted in FIG. 2. FIG. 9, blocks 920 and 925.

The alert tone may be sounded in numerous ways, as previously mentioned. For example, an input may be received from a user in the form of a voice command or a user's interaction with an input device (such as a touch screen or button). Block 930. Additionally, the alert tone may be automatically sounded based on a presence of an object within a predetermined distance. Block 935. For example, the alert tone may be sounded when an object (such as a pedestrian) is a certain distance from the vehicle, or when the vehicle communication system detects a signal emitted by a device carried by the pedestrian (such as a mobile phone).

Furthermore, alert tones that are received may be stored in a memory of the vehicle communication system. Block 940. For example, stored alert tones may be available for subsequent selection by a user, as previously discussed.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
    receiving a request for an alert tone from a vehicle communication system, wherein receiving a request for an alert tone comprises communicating with a personal communication device that is configured to establish a communication link with the vehicle communication system;
    providing a sample of the alert tone to the vehicle communication system, whereby the vehicle communication system permits a preview of the sample prior to provision of the requested alert tone; and
    providing the requested alert tone to enable the vehicle communication system to sound the alert tone upon actuation.

2. The method of claim 1, wherein providing the requested alert tone comprises communicating with the personal communication device that is configured to establish a communications link with the vehicle communication system.

3. The method of claim 1 further comprising providing a sample of the alert tone to the personal communication device that is configured to permit a preview of the sample prior to provision of the requested alert tone.

4. A method comprising:
    sending a request for an alert tone to a source of alert tones, wherein sending a request for an alert tone comprises communicating with the source via a personal communication device that is configured to establish a communication link with a vehicle communication system;
    receiving at the vehicle communication system carried by a vehicle the requested alert tone; and
    sounding the alert tone via the vehicle communication system.

5. The method of claim 4, wherein receiving the requested alert tone comprises communicating with the source via the personal communication device that is configured to establish a communications link with the vehicle communication system.

6. The method of claim 4 further comprising receiving a sample of the alert tone, wherein the sample can be previewed prior to receiving the requested alert tone from the source.

7. The method of claim 4, wherein sounding the alert tone comprises receiving an input from a user in the form of a voice command.

8. The method of claim 4, wherein sounding the alert tone comprises receiving an input from a user in the form of a user's interaction with an input device.

9. The method of claim 4, wherein sounding the alert tone comprises automatically sounding the alert tone based on a presence of an object within a predetermined distance.

10. The method of claim 4 further comprising storing the received alert tone in a memory of the vehicle communication system.

11. An apparatus comprising:
    a memory configured to store a plurality of alert tones; and
    a processor configured to receive a request for an alert tone from a vehicle communication system, wherein the processor is configured to communication with a personal communication device that is configured to establish a communication link with the communication system, to obtain the requested alert tone from the memory, to provide the requested alert tone to enable the vehicle communication system to sound the alert tone upon actuation, and to provide a sample of the alert tone to the vehicle communication system, whereby the vehicle communication system permits a preview of the sample prior to provision of the requested alert tone.

12. The apparatus of claim 11, wherein the processor is configured to provide a sample of the alert tone to a personal communication device that is configured to permit a preview of the sample prior to provision of the requested alert tone.

13. An apparatus comprising:
   a processor carried by a vehicle and configured to send a request for an alert tone to a source and to receive the requested alert tone from the source, wherein the processor is configured to establish a communications link with a personal communication device to send the request for the alert tone via the personal communication device; and
   an output device responsive to the processor and configured to sound the alert tone.

14. The apparatus of claim 13, wherein the processor is configured to establish a communications link with a personal communication device to receive the requested alert tone via the personal communication device.

15. The apparatus of claim 13, wherein the processor is configured to receive a sample of the alert tone, wherein the sample can be previewed prior to receiving the requested alert tone from the source.

16. The apparatus of claim 13, wherein the processor is configured to actuate the output device to sound the alert tone in response to an input from a user in the form of a voice command.

17. The apparatus of claim 13 further comprising an input device configured to communicate with the processor, wherein the processor is configured to actuate the output device to sound the alert tone based on a user's interaction with the input device.

18. The apparatus of claim 13, wherein the processor is configured to actuate the output device to sound the alert tone automatically based on a presence of an object within a predetermined distance.

19. The apparatus of claim 13 further comprising a memory configured to store a plurality of received alert tones.

20. The apparatus of claim 19 further comprising a display, wherein the processor is configured to provide a representation upon the display of each stored alert tone from which a user is permitted to designate the alert tone to be sounded.

* * * * *